United States Patent
Huang

(10) Patent No.: US 11,245,272 B2
(45) Date of Patent: Feb. 8, 2022

(54) OUTPUT PROTECTOR FOR CHARGER

(71) Applicant: Fuyuan Electronic Co., Ltd, Guangdong (CN)

(72) Inventor: Shaocheng Huang, Guangdong (CN)

(73) Assignee: Fuyuan Electronic Co., Ltd, Guangdong (CN)

( * ) Notice: Subject to any disclaimer, the term of this patent is extended or adjusted under 35 U.S.C. 154(b) by 69 days.

(21) Appl. No.: 16/885,290

(22) Filed: May 28, 2020

(65) Prior Publication Data
US 2021/0376648 A1    Dec. 2, 2021

(51) Int. Cl.
*H02J 7/00* (2006.01)
*H02J 7/08* (2006.01)

(52) U.S. Cl.
CPC ........ *H02J 7/0031* (2013.01); *H02J 7/00304* (2020.01); *H02J 7/00308* (2020.01); *H02J 7/08* (2013.01)

(58) Field of Classification Search
CPC ......... H02J 7/08; H02J 7/00308; H02J 7/0031
USPC ...................................................... 320/108
See application file for complete search history.

(56) References Cited

U.S. PATENT DOCUMENTS

| 10,122,191 B2 * | 11/2018 | Jin ........................ H03K 17/102 |
| 2006/0145658 A1 * | 7/2006 | Wang ................ H02J 7/00718 |
| | | 320/107 |
| 2007/0210758 A1 * | 9/2007 | Gangstoe .............. H02J 7/0031 |
| | | 320/134 |
| 2009/0197156 A1 * | 8/2009 | Goto ................... H02J 7/00309 |
| | | 429/93 |
| 2010/0181968 A1 * | 7/2010 | Kuo ...................... H02J 7/0031 |
| | | 320/163 |
| 2012/0206107 A1 * | 8/2012 | Ono ...................... H02J 7/0047 |
| | | 320/136 |
| 2014/0097798 A1 * | 4/2014 | Han ...................... H02J 7/0029 |
| | | 320/128 |
| 2019/0370622 A1 * | 12/2019 | Li ....................... G08B 13/2402 |
| 2020/0259325 A1 * | 8/2020 | Li ....................... H02J 7/00041 |

\* cited by examiner

*Primary Examiner* — Jerry D Robbins

(57) ABSTRACT

An output protector for chargers connected to the output terminal of charger, comprising a MOS tube as electronic switch, a light switchover signal terminal, a power output V+ terminal, a power GND terminal connected to the source of the MOS tube, and a power output V− terminal connected to the drain of the MOS tube. The power output V+ terminal and power GND terminal are connected to the output terminal anode and cathode of charger respectively. The light switchover signal terminal is connected to the charging state signal output end of charger. The power output V+ terminal and power output V− terminal are connected to the anode and cathode of battery, and the output protector has a triode on-unit which drives the MOS tube after the power output V+ terminal and power output V− terminal are connected to the anode and cathode of battery respectively.

10 Claims, 2 Drawing Sheets

OUTPUT PROTECTOR FOR CHARGER

BACKGROUND OF INVENTION

1. Field of the Invention

The present invention relates generally to the technical field of charger fitting products, and more particularly to an output protector for charger.

2. Description of Related Art

The charger is a device for charging different electronic products, it is used extensively, becoming a requisite component for electronic products.

If the charger is reversely connected to the battery terminals, the internal circuit of charger and the battery are likely to be burnt, and safety accidents are likely to happen. Meanwhile the charger cannot switch off the circuit completely to stop charging the battery when the charging is done.

SUMMARY OF THE INVENTION

The purpose of the present invention is to overcome the shortcomings of the prior art and provide an output protection device for a charger. In order to solve the above technical problems, the present invention adopts the following first technical solution:

An output protector for charger, comprising an output protector (100) connected to an output terminal of a charger, wherein the output protector includes a MOS tube as an electronic switch, a light switchover signal terminal connected to a grid of the MOS tube, a power output V+ terminal connected to the grid of the MOS tube through a first capacitor, a power GND terminal connected to a source of the MOS tube, and a power output V− terminal connected to a drain of the MOS tube; the power output V+ terminal and power GND terminal are connected to the output terminal anode and cathode of charger respectively; the light switchover signal terminal is connected to the charging state signal output end of charger; the power output V+ terminal and power output V− terminal are connected to the anode and cathode of a battery respectively, and the output protector has a triode on-unit which drives the MOS tube after the power output V+ terminal and power output V− terminal are connected to the anode and cathode of battery respectively.

More particularly, wherein when the power output V− terminal and power output V− terminal are not connected to the battery and the power supply is switched on, the light switchover signal terminal is low potential, the triode on-unit does not work, the voltage of power output V+ terminal passes through the first capacitor, the grid voltage of MOS tube is higher than 2.5V instantaneously, the MOS tube is turned on instantaneously; when the light switchover signal terminal is low potential, the grid voltage of MOS tube is reduced rapidly, and low potential remains, the MOS tube is turned off, the power output V+ terminal and power output V− terminal have no output, implementing no-load protection; when the battery is connected reversely before the power supply is actuated, the voltage of power output V+ terminal passes through the first capacitor, the grid voltage of MOS tube is higher than 2.5V instantaneously, the MOS tube is turned on instantaneously, but the light switchover signal terminal is low potential, the grid voltage of MOS tube is reduced rapidly, and low potential remains, the MOS tube is turned off, and the battery is connected reversely, the triode on-unit does not work; the MOS tube remains off, the power output V+ terminal and power output V− terminal have no output, implementing reverse connection protection; when the battery is connected positively, the voltage of battery drives the triode on-unit to work; the triode on-unit makes the grid voltage of MOS tube higher than 2.5V, the MOS tube is turned on; the battery is charged, the charger exports high level light switchover signal to the light switchover signal terminal, so that the light switchover signal terminal keeps high potential, the grid voltage of MOS tube remains higher than 2.5V, the charger charges the battery continuously; when the battery is fully charged, the charger exports low level light switchover signal to the light switchover signal terminal, so that the light switchover signal terminal keeps low potential, the grid voltage of MOS tube is reduced, the MOS tube is turned off, the output is shut off, implementing full charge switch off.

More particularly, wherein the triode on-unit includes a triode, a resistor R2 and a capacitor C2 connected to b pole of triode, a resistor R1 connected to the e pole of triode and a resistor R5 for discharging capacitor C2; the resistor R1 and resistor R2 are connected to the power output V+ terminal; the c pole of the triode is connected to the grid of the MOS tube; the capacitor C2 is connected to the drain of MOS tube and power output V− terminal.

More particularly, wherein the grid and source of the MOS tube are connected by a stabilivolt tube.

More particularly, wherein a resistor R3 is connected in parallel across the stabilivolt tube.

More particularly, wherein the resistance value of the resistor R2 is 28 times of the resistance value of resistor R1.

More particularly, wherein the grid of the MOS tube and the light switchover signal terminal are connected by a diode D1.

More particularly, wherein the model of the MOS tube is NCEP01T13.

More particularly, wherein the model of the triode is 2N5401.

In order to solve the above technical problems, the present invention adopts the following second technical solution: An output protector for charger connected to an output terminal of a charger, wherein the output protector comprises a MOS tube as electronic switch, a power output V+ terminal, a light switchover signal terminal connected to the grid of the MOS tube, a VCC terminal connected to the grid of the MOS tube through a first capacitor, a power GND terminal connected to the source of the MOS tube, and a power output V− terminal connected to the drain of the MOS tube; the power output V+ terminal and power GND terminal are connected to the output terminal anode and cathode of charger respectively; the light switchover signal terminal is connected to the charging state signal output end of charger; the VCC terminal is connected to the VCC terminal of charger; the power output V+ terminal and power output V− terminal are connected to the anode and cathode of battery respectively, and the output protector has a triode on-unit which drives the MOS tube after the power output V+ terminal and power output V− terminal are connected to the anode and cathode of battery respectively.

The charger is provided with an additional small PCB, so that the charger has multiple protection functions: 1, no-load (not connected to battery) no-output protection, 2, battery reverse connection protection, 3, charger red light to green light charge stop. The present invention can implement multistage protection, so as to assist the charging work of charger. It is applicable to different chargers, and it is very convenient. The present invention has few electronic components, simple layout, multiple functions can be implemented, so that the present invention has very strong marketability. In addition, the circuit of the present invention can be integrated into the PCB of charger, it can be designed according to practical requirements.

DETAILED DESCRIPTION OF THE INVENTION

The detailed description is given below according to the attached figures.

Figure 1:
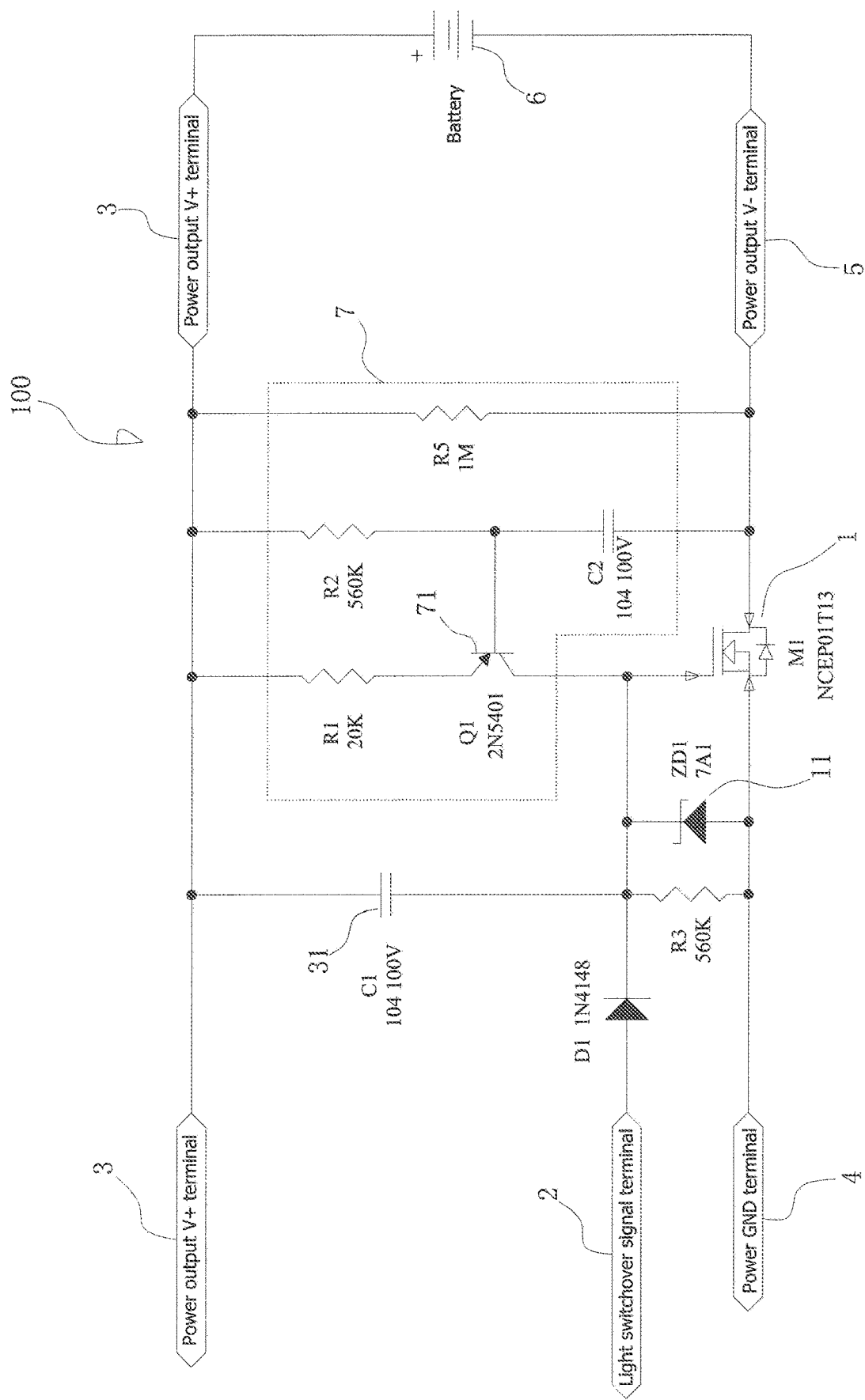
FIG. 1 is a circuit diagram of Embodiment 1 of the present invention.

FIG. 1 shows an output protector for charger, it is the Embodiment 1 of the present invention. The output protector 100 is connected to the output terminal of charger, wherein the output protector 100 comprises a MOS tube 1 as electronic switch, a light switchover signal terminal 2 connected to the grid of the MOS tube 1, a power output V+ terminal 3 connected to the grid of the MOS tube 1 through a first capacitor 31, a power GND terminal 4 connected to the source of the MOS tube 1, and a power output V− terminal 5 connected to the drain of the MOS tube 1. The power output V+ terminal 3 and power GND terminal 4 are connected to the output terminal anode and cathode of charger respectively. The light switchover signal terminal 2 is connected to the charging state signal output end of charger. The power output V+ terminal 3 and power output V− terminal 5 are connected to the anode and cathode of battery 6 respectively. The output protector 100 has a triode on-unit 7 which drives the MOS tube 1 after the power output V+ terminal 3 and power output V− terminal 5 are connected to the anode and cathode of battery 6 respectively. When the power supply is standby (charger is connected to grid, but not to battery), the light switchover signal terminal is low potential (OV). When the output current is higher than 0.2 A, the light switchover signal terminal changes to high potential (16V). When the power output V+ terminal 3 and power output V− terminal 5 are not connected to the battery 6, and the power supply is switched on (charger is connected to grid), the light switchover signal terminal 2 is low potential, the triode on-unit 7 does not work, the voltage of power output V+ terminal 3 pass through the first capacitor 31, so that the grid voltage of MOS tube 1 becomes higher than 2.5V instantaneously, the MOS tube 1 is turned on instantaneously, but as the light switchover signal terminal 2 is low potential, the grid voltage of MOS tube 1 is reduced rapidly and low potential remains, the MOS tube 1 is turned off. The power output V+ terminal 3 and power output V− terminal 5 have no output, implementing no-load protection. When the battery is connected reversely and then the power supply is started (i.e. charger is connected to grid), the voltage of power output V+ terminal 3 passes through the first capacitor 31, so that the grid voltage of MOS tube 1 becomes higher than 2.5V instantaneously, the MOS tube 1 is turned on instantaneously, but as the light switchover signal terminal 2 is low potential, the grid voltage of MOS tube 1 is reduced rapidly and the low potential remains, the MOS tube 1 is turned off, and the battery is connected reversely, the triode on-unit 7 does not work, the MOS tube 1 remains off, the power output V+ terminal 3 and power output V− terminal 5 have no output, implementing reverse connection protection. When the battery 6 is connected positively, the voltage of battery 6 drives the triode on-unit 7 to work. The triode on-unit 7 makes the grid voltage of MOS tube 1 higher than 2.5V, the MOS tube 1 is turned on. The battery is charged, the charger exports high level light switchover signal to the light switchover signal terminal 2, so that the light switchover signal terminal 2 keeps high potential, and the grid voltage of MOS tube 1 remains higher than 2.5V, the charger charges the battery continuously. When the battery is full, the charger exports low level light switchover signal to light switchover signal terminal 2, the light switchover signal terminal 2 keeps low potential, the grid voltage of MOS tube 1 is reduced, the MOS tube 1 is turned off, the output is shut off, implementing full charge switch off.

As a small PCB, the present invention is designed independent of the charger, the charger is provided with an additional small PCB, so that the charger has multiple protection functions: 1, no-load (not connected to battery) no-output protection, 2, battery reverse connection protection, 3, charger red light to green light charge stop. The present invention can implement multistage protection, so as to assist the charging work of charger. It is applicable to different chargers, and it is very convenient. The present invention has few electronic components, simple layout, multiple functions can be implemented, so that the present invention has very strong marketability. In addition, the circuit of the present invention can be integrated into the PCB of charger, it can be designed according to practical requirements.

The triode on-unit 7 comprises a triode 71, a resistor R2 and a capacitor C2 connected to b pole of triode 71, a resistor R1 connected to e pole of triode 71 and a resistor R5 for discharging capacitor C2. The resistor R1 and resistor R2 are connected to the power output V+ terminal 3. The c pole of the triode 71 is connected to the grid of the MOS tube 1. The capacitor C2 is connected to the drain of MOS tube 1 and power output V− terminal 5, wherein the resistance value of the resistor R2 is 28 times of the resistance value of resistor R1. When the power output V+ terminal 3 and power output V− terminal 5 are not connected to battery 6 and the power supply is actuated, or when the battery is connected reversely before the power supply is switched on, the triode 71 in the triode on-unit 7 remains in non-conducting state, so that the triode on-unit 7 does not work. When the battery 6 is connected positively, the voltage of battery 6 charges capacitor C2 through resistor R2, the b pole potential of triode 71 is reduced as the capacitor C2 is charged at the moment of charge, so that the triode 71 is turned on, the triode on-unit 7 works. The grid voltage of MOS tube 1 is higher than 2.5V after the triode 71 is turned on, the MOS tube 1 is turned on. Afterwards, the resistor R5 discharges the capacitor C2, the charger charges the battery normally. When the battery is being charged, the charge warning light of charger is red light, the charger exports high level light switchover signal to the light switchover signal terminal 2, the light switchover signal terminal 2 keeps high potential, the grid voltage of MOS tube 1 remains higher than 2.5V, the charger charges the battery continuously. When the battery is fully charged, the charge warning light of charger changes from red light into green light, the charger exports low level light switchover signal to light switchover signal terminal 2, so that the light switchover signal terminal 2 keeps low potential, the grid voltage of MOS tube 1 is reduced, the MOS tube 1 is turned off, the output is shut off, implementing full charge switch off. The power GND terminal 4 and power output V− terminal 5 are equivalent to an open circuit, so that the charger cannot charge the battery the battery anymore, the circuit is switched off a hundred percent, the battery load will not be charged, the loss is reduced.

The grid and source of the MOS tube 1 are connected by a stabilivolt tube 11, guaranteeing the turn on when the grid voltage of MOS tube 1 is higher than 2.5V, and guaranteeing steady operation of MOS tube 1, so that the operation of the present invention is more reliable. A resistor R3 is parallel connected to both ends of the stabilivolt tube 11.

The grid of the MOS tube 1 and the light switchover signal terminal 2 are connected by a diode D1. The diode D1 can isolate the grid of MOS tube from the low level of light switchover signal, so as to reduce the capacity of the first capacitor 31, the short circuit effect is better.

The model of the MOS tube 1 is NCEP01T13. The model of the triode 71 is 2N5401.

To sum up, as a small PCB, in the present invention is designed independent of the charger, the charger is provided with an additional small PCB, so that the charger has multiple protection functions: 1, no-load (not connected to battery) no-output protection, 2, battery reverse connection protection, 3, charger red light to green light charge stop. The present invention can implement multistage protection, so as to assist the charging work of charger. It is applicable to different chargers, it is very convenient.

The present invention has few electronic components, simple layout, multiple functions can be implemented, so that the present invention has very strong marketability. Certainly, the circuit of the present invention can be integrated into the PCB of charger, it can be designed according to practical requirements.

Figure 2:
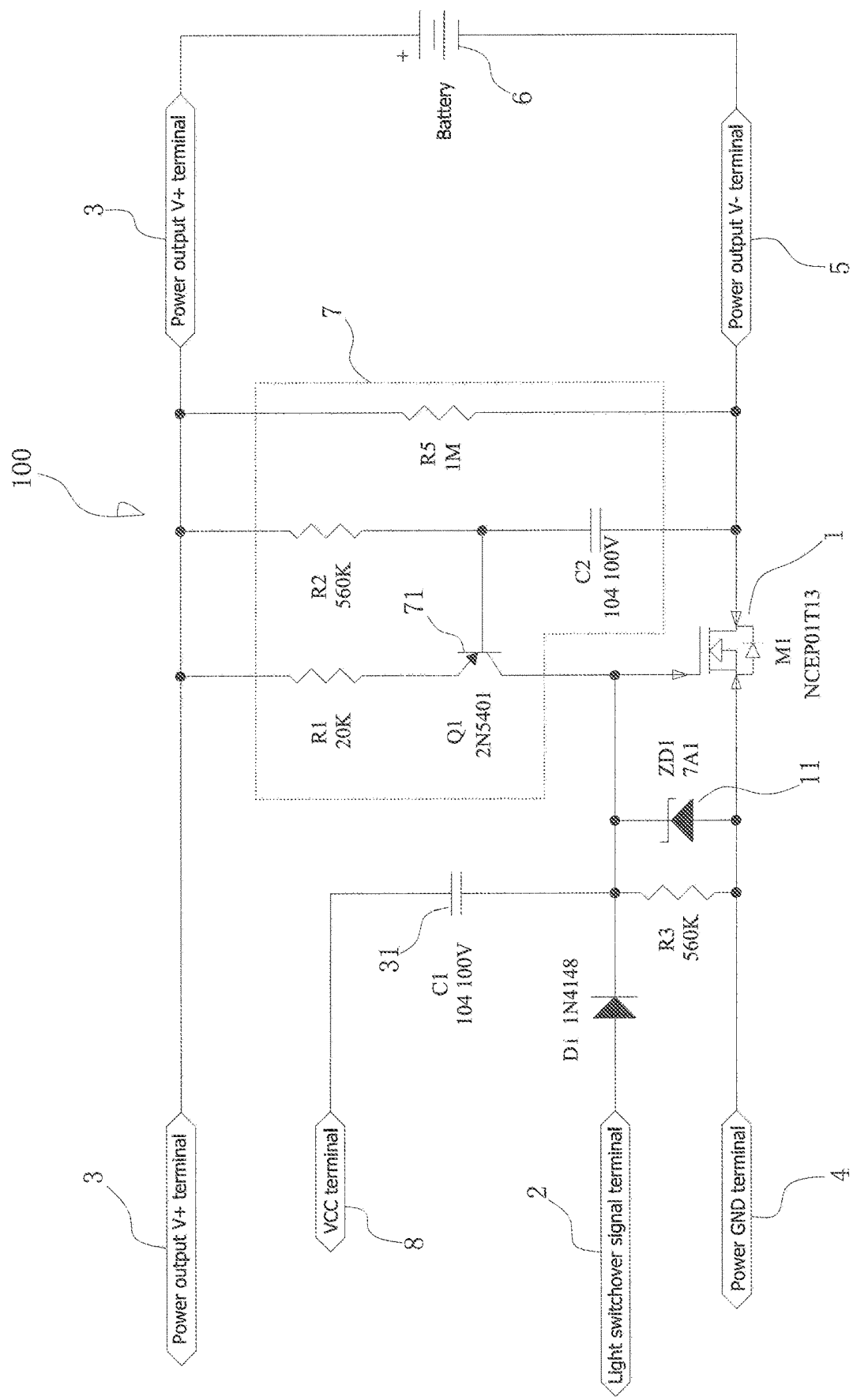
FIG. 2 is a circuit diagram of Embodiment 2 of the present invention.

FIG. 2 shows the Embodiment 2 of the present invention. The difference between the Embodiment 2 and the above Embodiment 1 is that the output protector 100 comprises a MOS tube 1 as electronic switch, a power output V+ terminal 3, a light switchover signal terminal 2 connected to the grid of the MOS tube 1, a VCC terminal 8 connected to the grid of the MOS tube 1 through the first capacitor 31, a power GND terminal 4 connected to the source of the MOS tube 1, and a power output V− terminal 5 connected to the drain of the MOS tube 1. The VCC terminal 8 is connected to the VCC terminal of charger. In the Embodiment 2, the first capacitor 31 is located between the VCC terminal 8 and the grid of the MOS tube 1. The advantage is that the circuit of the present invention can be integrated into the PCB of charger, the first capacitor 31, VCC terminal 8 and grid of the MOS tube 1 are connected, convenient for wiring.

The other structures of the Embodiment 2 are identical with the other structures of Embodiment 1, which are not detailed anymore.

I claim:

1. An output protector for charger, comprising an output protector (100) connected to an output terminal of a charger, wherein the output protector (100) includes a MOS tube (1) as an electronic switch, a light switchover signal terminal (2) connected to a grid of the MOS tube (1), a power output V+ terminal (3) connected to the grid of the MOS tube (1) through a first capacitor (31), a power GND terminal (4) connected to a source of the MOS tube (1), and a power output V− terminal (5) connected to a drain of the MOS tube (1); the power output V+ terminal (3) and power GND terminal (4) are connected to the output terminal anode and cathode of charger respectively; the light switchover signal terminal (2) is connected to the charging state signal output end of charger; the power output V+ terminal (3) and power output V− terminal (5) are connected to the anode and cathode of a battery (6) respectively, and the output protector (100) has a triode on-unit (7) which drives the MOS tube (1) after the power output V+ terminal (3) and power output V− terminal (5) are connected to the anode and cathode of battery (6) respectively.

2. The output protector for charger defined in claim 1, wherein
when the power output V+ terminal (3) and power output V− terminal (5) are not connected to the battery (6) and the power supply is switched on, the light switchover signal terminal (2) is low potential, the triode on-unit (7) does not work, the voltage of power output V+ terminal (3) passes through the first capacitor (31), the grid voltage of MOS tube (1) is higher than 2.5V instantaneously, the MOS tube (1) is turned on instantaneously; when the light switchover signal terminal (2) is low potential, the grid voltage of MOS tube (1) is reduced rapidly, and low potential remains, the MOS tube (1) is turned off, the power output V+ terminal (3) and power output V− terminal (5) have no output, implementing no-load protection;
when the battery is connected reversely before the power supply is actuated, the voltage of power output V+ terminal (3) passes through the first capacitor (31), the grid voltage of MOS tube (1) is higher than 2.5V instantaneously, the MOS tube (1) is turned on instantaneously, but the light switchover signal terminal (2) is low potential, the grid voltage of MOS tube (1) is reduced rapidly, and low potential remains, the MOS tube (1) is turned off, and the battery is connected reversely, the triode on-unit (7) does not work; the MOS tube (1) remains off, the power output V+ terminal (3) and power output V− terminal (5) have no output, implementing reverse connection protection;
when the battery (6) is connected positively, the voltage of battery (6) drives the triode on-unit (7) to work; the triode on-unit (7) makes the grid voltage of MOS tube (1) higher than 2.5V, the MOS tube (1) is turned on; the battery is charged, the charger exports high level light switchover signal to the light switchover signal terminal (2), so that the light switchover signal terminal (2) keeps high potential, the grid voltage of MOS tube (1) remains higher than 2.5V, the charger charges the battery continuously; when the battery is fully charged, the charger exports low level light switchover signal to the light switchover signal terminal (2), so that the light switchover signal terminal (2) keeps low potential, the grid voltage of MOS tube (1) is reduced, the MOS tube (1) is turned off, the output is shut off, implementing full charge switch off.

3. The output protector for charger defined in claim 1, wherein the triode on-unit (7) includes a triode (71), a resistor R2 and a capacitor C2 connected to b pole of triode (71), a resistor R1 connected to the e pole of triode (71) and a resistor R5 for discharging capacitor C2; the resistor R1 and resistor R2 are connected to the power output V+ terminal (3); the c pole of the triode (71) is connected to the grid of the MOS tube (1); the capacitor C2 is connected to the drain of MOS tube (1) and power output V− terminal (5).

4. The output protector for charger defined in claim 3, wherein the grid and source of the MOS tube (1) are connected by a stabilivolt tube (11).

5. The output protector for charger defined in claim 4, wherein a resistor R3 is connected in parallel across the stabilivolt tube (11).

6. The output protector for charger defined in claim 3, wherein the resistance value of the resistor R2 is 28 times of the resistance value of resistor R1.

7. The output protector for charger defined in claim 3, wherein the model of the triode (71) is 2N5401.

8. The output protector for charger defined in claim 1, wherein the grid of the MOS tube (1) and the light switchover signal terminal (2) are connected by a diode D1.

9. The output protector for charger defined in claim 1, wherein the model of the MOS tube (1) is NCEP01T13.

10. An output protector for charger connected to an output terminal of a charger, wherein the output protector (100) comprises a MOS tube (1) as electronic switch, a power output V+ terminal (3), a light switchover signal terminal (2) connected to the grid of the MOS tube (1), a VCC terminal (8) connected to the grid of the MOS tube (1) through a first capacitor (31), a power GND terminal (4) connected to the source of the MOS tube (1), and a power output V− terminal (5) connected to the drain of the MOS tube (1); the power output V− terminal (3) and power GND terminal (4) are connected to the output terminal anode and cathode of charger respectively; the light switchover signal terminal (2) is connected to the charging state signal output end of charger; the VCC terminal (8) is connected to the VCC terminal of charger; the power output V+ terminal (3) and power output V− terminal (5) are connected to the anode and cathode of battery (6) respectively, and the output protector (100) has a triode on-unit (7) which drives the MOS tube (1) after the power output V+ terminal (3) and power output V− terminal (5) are connected to the anode and cathode of battery (6) respectively.

* * * * *